United States Patent

Cavallaro et al.

[11] Patent Number: 5,837,892
[45] Date of Patent: Nov. 17, 1998

[54] METHOD AND APPARATUS FOR MEASURING THE SIZE OF DROPS OF A VISCOUS MATERIAL DISPENSED FROM A DISPENSING SYSTEM

[75] Inventors: William A. Cavallaro, Bradford; Steven P. Bibeault; Jules Gordon, both of Methuen, all of Mass.

[73] Assignee: Camelot Systems, Inc., Haverhill, Mass.

[21] Appl. No.: 738,093

[22] Filed: Oct. 25, 1996

[51] Int. Cl.$^6$ ............................ G01F 13/00; G01F 25/00; G01B 11/08
[52] U.S. Cl. ............................ 73/149; 73/1.74; 356/384; 222/55
[58] Field of Search .................. 73/1.74, 149, 53.01; 222/55; 356/379, 384

[56] References Cited

U.S. PATENT DOCUMENTS

| | | | |
|---|---|---|---|
| 4,967,933 | 11/1990 | Maiorca et al. | 222/1 |
| 5,052,338 | 10/1991 | Maiorca et al. | 118/668 |
| 5,110,615 | 5/1992 | Maiorca et al. | 427/8 |
| 5,320,250 | 6/1994 | La et al. | 222/1 |
| 5,465,879 | 11/1995 | La et al. | 222/189 |
| 5,505,777 | 4/1996 | Ciardella et al. | 118/663 |

FOREIGN PATENT DOCUMENTS 5-180683  7/1993  Japan ........................................ 73/149

OTHER PUBLICATIONS excerpt from Cole–Palmer 97–98 catalog, p. 559, copyright 1996.
translation of Matsumoto et al., JP 5–180683.

Primary Examiner—Michael Brock
Attorney, Agent, or Firm—Mintz, Levin, Cohn, Ferris, Glovsky and Popeo, P.C.

[57] ABSTRACT

A method and apparatus for measuring and controlling the size of drops of viscous material dispensed from a dispensing system. A dispensing apparatus in accordance with embodiments of the present invention includes a housing, a dispenser that dispenses a quantity of the viscous material, a measuring apparatus having a bottom plate to receive the viscous material, a top plate that is positioned over the bottom plate after the viscous material has been dispensed, and a compressing apparatus that compresses the material between the top and bottom plates. The dispensing apparatus further includes a viewing system that views the compressed material to determine the quantity of material dispensed by the dispenser. In one embodiment, the dispensing apparatus includes a controller that controls the quantity of viscous material dispensed based on the quantity of material determined by the viewing system.

24 Claims, 3 Drawing Sheets

METHOD AND APPARATUS FOR MEASURING THE SIZE OF DROPS OF A VISCOUS MATERIAL DISPENSED FROM A DISPENSING SYSTEM

FIELD OF THE INVENTION

The present invention relates generally to a method and apparatus for measuring volume and/or weight of quantities of viscous materials, and more particularly, to a method and apparatus for measuring and controlling the size of drops of viscous material dispensed from a dispensing system.

DISCUSSION OF THE RELATED ART

There are several types of prior art dispensing machines used for dispensing metered amounts of liquid or paste for a variety of applications. One such application is in the assembly of surface mount printed circuit boards, wherein a large quantity of small dots of adhesive liquid are dispensed in precise, predetermined locations on a circuit board. The dots of adhesive liquid are used for connecting components to the circuit board. Another application of dispensing machines is in dispensing viscous material used for encapsulating integrated circuit chips and/or for under filling flip integrated circuit chips. The dispensing machines are generally required to run continuously to achieve a high throughput, and are also required to achieve a high degree of repeatability (i.e., be able to dispense substantially identical dots with a very small tolerance or variability between dots). The dispensing systems described above include those manufactured by Knight Tool Company, the assignee of the present invention, and distributed by Camelot Systems under the name CAM/ALOT®.

In one prior art dispensing system, the weight of the dots dispensed by the system is periodically measured by a scale during calibration routines, and the dispensing system includes a feedback system to adjust the quantity of fluid dispensed by the dispensing system, so that the weight of the dots is controlled. There are several drawbacks associated with this prior art system, and these drawbacks are of particular concern in dispensing systems used for dispensing solder paste in precise locations on a circuit board, and in dispensing systems used for under filling flip chips. In these systems, the desired weight of the viscous drops is typically on the order of 0.002 grams. Scales utilized to accurately measure dots of this size are typically rather expensive, and the measured weight of a sample can vary greatly depending on temperature of the air, temperature of the sample, and due to vibration of the scale.

A further problem associated with the prior art dispensing systems that use a scale to measure the weight of dispensed drops is that the materials dispensed by these systems are typically hazardous materials that require special precautions for disposal. Thus, each of the drops generated during a calibration cycle must be manually removed from the dispensing machine and disposed of appropriately.

SUMMARY OF THE INVENTION

Embodiments of the present invention overcome the drawbacks of the prior art dispensing systems described above, and provide a method and apparatus for determining volume and/or weight of drops produced by a dispensing system during a calibration routine of the dispensing system. In embodiments of the present invention, a feedback control system, utilizing the method and apparatus for determining volume and/or weight, is incorporated into a dispensing system to ensure that consistent drops of a predetermined size are dispensed by the dispensing system.

In a first embodiment of the present invention, a dispensing system for dispensing material onto a substrate includes a housing, a dispensing apparatus that dispenses a metered quantity of material, and a measuring apparatus. The measuring apparatus includes a bottom plate having a top surface to receive the material dispensed from the dispensing apparatus, a top plate positionable over the bottom plate after the material has been dispensed, and a compressing apparatus that compresses the material between the top and bottom plates. The dispensing system further includes a viewing system, coupled to the housing, that views the compressed material in the measuring apparatus to determine the quantity of material dispensed.

In an alternate version of the first embodiment, the dispensing system further includes a control system that controls the quantity of material dispensed by the dispensing apparatus based on the quantity of material measured by the viewing system, thereby establishing a closed loop system that controls the quantity of material dispensed.

In a second embodiment of the present invention, a dispensing system includes a housing, a dispensing apparatus that dispenses a quantity of material, and a measuring apparatus. The measuring apparatus includes a bottom plate having a top surface to receive the material dispensed from the dispensing apparatus, a top plate positionable over the bottom plate after the material has been dispensed, and a compressing apparatus that compresses the material between the top and bottom plates. The dispensing system further includes means for determining the quantity of material dispensed based on characteristics of the material compressed in the measuring apparatus.

In an alternate version of the second embodiment, the dispensing system further includes means for controlling the quantity of material dispensed by the dispensing apparatus based on the quantity of material determined by the means for determining, thereby establishing a closed loop system that controls the quantity of material dispensed.

In a third embodiment of the present invention, a measuring apparatus for determining a quantity of a viscous material includes a housing, a bottom plate having a top surface to receive the viscous material, a top plate positionable over the bottom plate after the viscous material has been received, a compressing apparatus that compresses the viscous material between the top and bottom plates, and a viewing system that views the compressed viscous material to determine the quantity of viscous material dispensed.

In an alternate version of the third embodiment, the measuring apparatus further includes a gap shim disposed between the top plate and the bottom plate such that the compressed viscous material has a width equal to a width of the gap shim.

Another embodiment of the present invention is directed to a method of measuring a quantity of material dispensed from a dispensing apparatus. The method includes steps of dispensing the material on to a bottom plate, disposing a top plate over the bottom plate, compressing the material between the top plate and the bottom plate, and viewing the compressed material through the top plate to determine the quantity of material dispensed.

In a preferred embodiment of the method of measuring a quantity of material, the method further includes steps of comparing the quantity of material dispensed with a desired quantity to generate an error signal indicative of a difference between the desired quantity and the quantity dispensed, and controlling the quantity of material dispensed by the dispensing system based on the error signal.

DESCRIPTION OF THE DRAWINGS

For a better understanding of the present invention, reference is made to the drawings which are incorporated herein by reference and in which.

DETAILED DESCRIPTION

For purposes of illustration only, and not to limit generality, the present invention will now be explained with reference to a dispensing system used to dispense an adhesive, solder paste, or some other media onto a substrate such as a circuit board or an integrated circuit chip. One skilled in the art will appreciate, however, that embodiments of the present invention are not limited to dispensing systems, but rather, the volumetric measuring apparatus in accordance with embodiments of the present invention may be used in other applications requiring precise, volume or weight measurements of small quantities of viscous materials.

Figure 1:
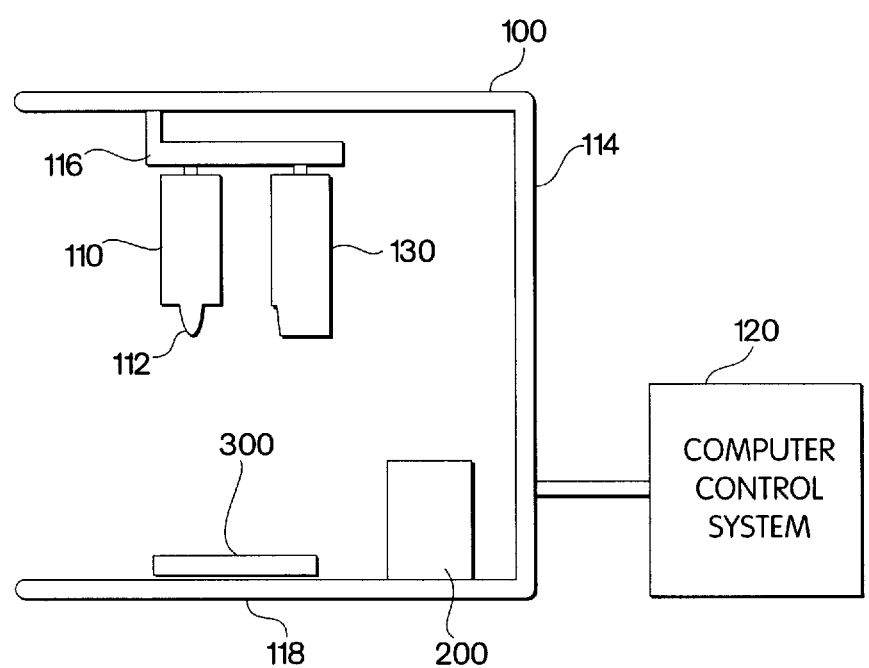
FIG. 1 is a drawing of a dispensing system in accordance with one embodiment of the present invention.

FIG. 1 shows a liquid dispensing system 100 in accordance with one embodiment of the present invention. The liquid dispensing system 100 includes a pump and dispenser assembly 110, a computer control system 120, a vision system 130, and a volumetric measuring apparatus 200. The liquid dispensing system 100 has a frame 114 having a lower base 118 for supporting a circuit board 300 or some other substrate that is to receive drops of material dispensed by the pump and dispenser assembly 110. The pump and dispenser assembly 110 and the vision system 130 are coupled to an arm 116 which in turn is movably coupled to the frame 114 of the dispensing system 100. The arm 116 can be moved, using motors (not shown), under the control of the computer control system, in X, Y and Z directions, to locate the pump and dispenser assembly 110 and the vision system 130 at predetermined locations and heights over the circuit board 300 and the volumetric measuring apparatus 200.

The dispensing system 100 operates as follows. The circuit board 300, or some other substrate that is to receive drops from the dispensing system, is placed on the base 118 of the dispensing system. The circuit board 300 may be placed on the base manually, or in a preferred embodiment, a conveyor system is used for loading circuit boards into the dispensing system 100. The base 118 may also include a vacuum lift table for securing the board 300 to the base 118 during the dispensing operation.

The pump and dispenser assembly 110 dispenses drops of material through a nozzle 112 at predetermined points on the circuit board 300. The material is stored in a container (not shown), coupled to the pump and dispenser assembly, at a constant pressure. In a preferred embodiment, the pump and dispenser assembly contains an auger within an auger chamber. The auger is precisely turned within the auger chamber to dispense metered quantities of liquid. The auger and auger chamber are described in patent application Ser. No. 08/562,068, assigned to the assignee of the present invention, and incorporated herein by reference.

The computer control system 120 controls motors (not shown) to move the arm 116 in the X, Y, and Z directions to properly position nozzle 112 of the pump and dispenser assembly 110 over the circuit board to ensure that dispensing occurs at the predetermined points on the circuit board. The computer control system is pre-programmed with a desired dot pattern for the circuit board and may contain programs for depositing drops on several different types of circuit boards or other substrates.

The vision system 130 is used for providing proper alignment of the pump and dispenser 110 with the circuit board 300 prior to the dispensing of drops onto the circuit board. The vision system 130 locates fiducial points or other recognizable patterns on the circuit board in order to properly align the pump and dispenser assembly with the circuit board. The vision system is also used after dispensing has occurred to inspect the material that has been deposited onto the circuit board (or some other substrate) to ensure that the proper amount of material has been deposited, and to ensure that the material has been deposited in the proper locations on the circuit board. As described below in further detail, the vision system is also used in conjunction with the volumetric measuring apparatus to determine the volume of drops dispensed from the dispensing system during a calibration routine. In one embodiment, the vision system is implemented using a Cognex® 5200 Vision Processor and Video Mixer Card manufactured by Cognex, Inc., Ser. No. 08/562, 068, MA.

Figure 2:
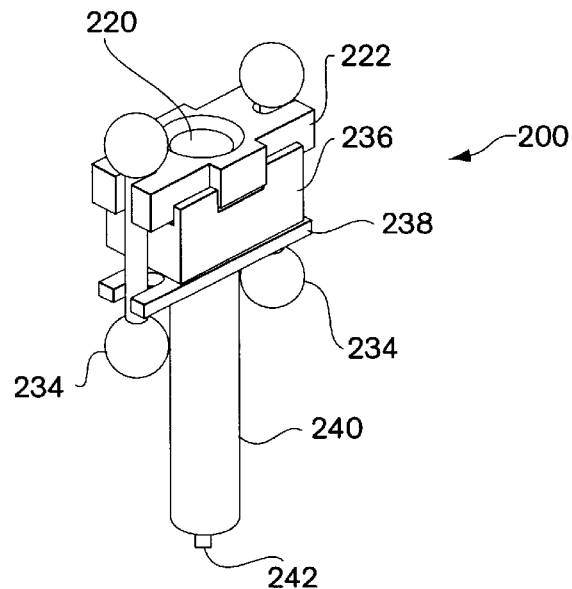
FIG. 2 is a perspective view of an apparatus used to measure volumetric output in the dispensing system of FIG. 1.
Figure 3:
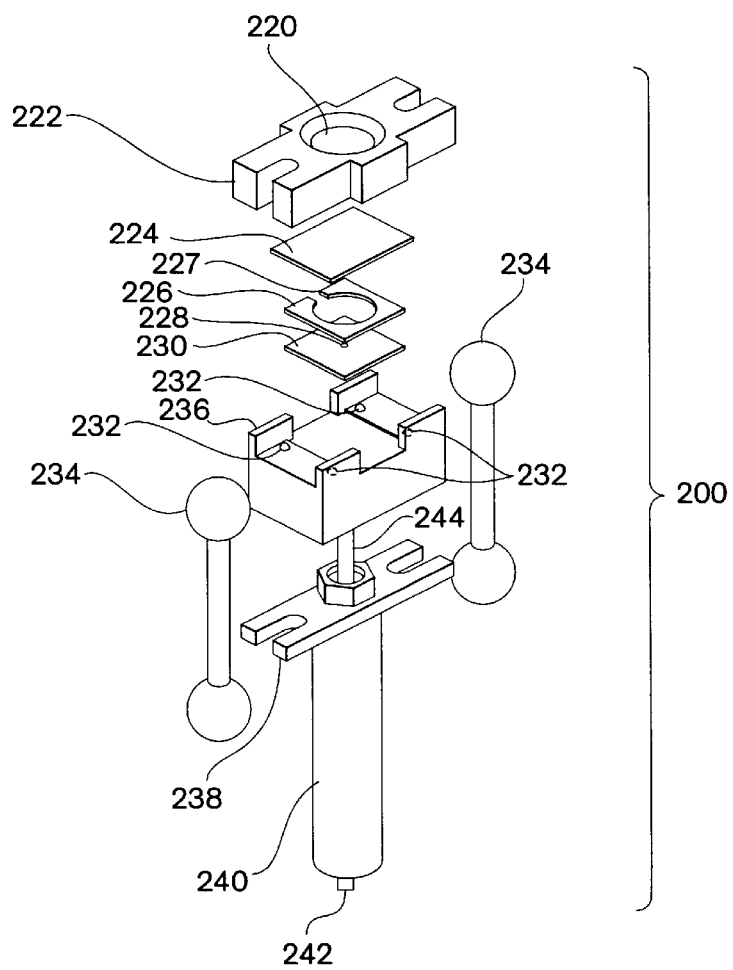
FIG. 3 is an exploded perspective view of the apparatus for measuring volumetric output of FIG. 2.

The volumetric measuring apparatus 200 is shown in greater detail in FIGS. 2 and 3. The volumetric measuring apparatus has a bottom plate 230 on which a drop of material 228 is deposited from the pump and dispenser assembly 110 during a calibration routine of the dispensing system 100. In one embodiment, the bottom plate 230 is a clear glass slide. The bottom plate is supported by four slide supports 232 located on a lower bracket 236. The lower bracket 236 is disposed over a pressure yoke 238 which is coupled to a frictionless cylinder 240 having an air inlet 242 for coupling to a pressurized air supply (not shown). The frictionless cylinder has a movable piston 244 coupled to the lower bracket 236.

After a drop has been deposited on the bottom plate 230, a gap shim 226 is placed on the bottom plate, and a top plate 224 is placed on top of the gap shim. The top plate is made from glass or some other transparent material so that the drop can be seen through the top plate. A pressure plate 222 is then placed upon the top plate and coupled to the pressure yoke 238 using two dumbbell shaped force rods 234. The pressure plate 222 has a circular viewing hole 220 for viewing the sample drop 228 through the pressure plate 222.

The volumetric measuring apparatus 200 operates within the dispensing system 100 as follows. During a calibration routine of the dispensing system, the computer control system controls the arm 116 so as to position the pump and dispenser assembly 110 above the bottom plate 230. Initially, the top plate 224 and the pressure plate 222 are removed from above the bottom plate 230, so that a target drop may be deposited on the upper surface of the bottom plate. The removal of the pressure plate 222 and the top plate 224 may be done manually or may be accomplished automatically by the dispenser system 100 under the control of the computer control system 120.

After the target drop has been deposited on the bottom plate 230, the top plate 224 and the pressure plate 222 are placed on the gap shim 228 and secured to the volumetric measuring apparatus using the force rods 234. The placement of the top pressure glass slide 224 and the pressure plate 222 may be accomplished manually or automatically by the dispenser system 100 under the control of the computer control system 120.

Once the pressure plate 222 has been secured to the pressure yoke 238 using the force rods 234, air pressure is provided to the air inlet 242 of the frictionless cylinder 242 to extend the piston 244 of the cylinder 240 to provide a predetermined pressure to the target drop so that the target drop is compressed between the bottom plate 230 and the top plate 224. The predetermined pressure applied by the piston is determined based on characteristics of the liquid material being dispensed by the dispensing system. The predetermined pressure is sufficient to fully compress the target drop such that the top plate and the bottom plate are in continuous contact with the gap shim, so that the width of the target drop in the fixture is substantially equal to the width of the gap shim 226.

The width of the gap shim 226 is chosen based on the desired size of the target drop 228, such that the target drop becomes substantially cylindrical in shape when the volumetric measuring apparatus is in its fully compressed position with both the top and bottom plates in complete contact with the gap shim. The width of the gap shim should be greater than the size of any solid particles in the material being dispensed, so that both the top and bottom plates can come in contact with the gap shim; however, if the width of the gap shim is too large, the drop will not be sufficiently compressed to become cylindrical in shape. As shown in FIG. 3, the gap shim has a slot 227 to allow air to escape from between the top and bottom plates as the target drop is compressed. In one embodiment of the volumetric measuring apparatus, the gap shim has air slots equally positioned around the perimeter of gap shim to ensure that the air exiting the area between the plates is evenly distributed around the perimeter of the gap shim.

The computer control system 120 controls the motors on the arm 116 to position the vision system 130 over the viewing hole 220 of the volumetric measuring apparatus after the target drop has been compressed between the top and bottom plates. The vision system 130 views the target drop through the viewing port 220 and determines the surface area of the target drop and provides this information to the computer control system. The viewing system includes a lighting system (not shown) that provides light through the viewing hole on to the target sample to allow the viewing apparatus to view the target drop. Using the surface area of the target drop, and the known width of the gap shim 226, the volume of the target drop may be calculated by the computer control system 120.

Figure 4:
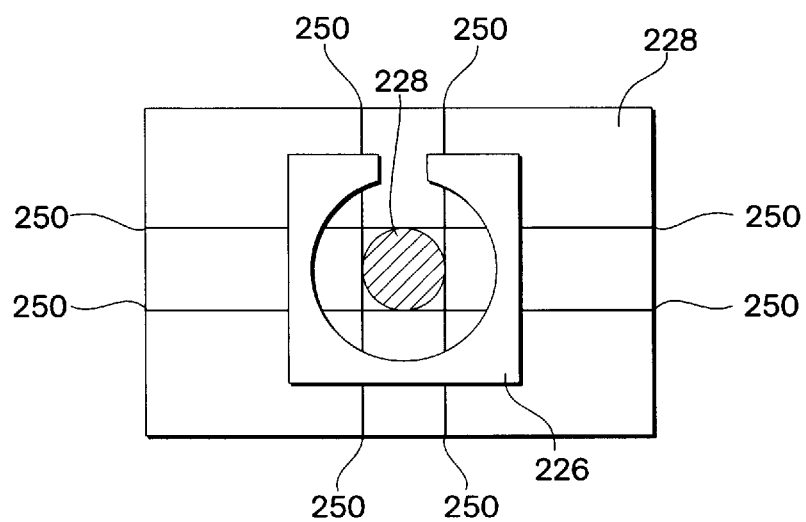
FIG. 4 shows a drop of material dispensed from a dispensing system in the apparatus for measuring volumetric output of FIGS. 2 and 3.

FIG. 4 shows a target drop 228 compressed between the top plate 224 and the bottom plate 230 as viewed through the viewing port 220. As shown in FIG. 4, the bottom plate and/or the top plate may have a number of opaque lines 250 detectable by the vision system to enable the vision system to provide a more precise determination of the surface area of the target drop. In one embodiment of the present invention, the opaque lines are positioned based on the desired size of the drop and based on the allowable tolerance in the size. In this embodiment, because the width of the compressed target drop is equal to the width of the gap shim 226, the viewing system can determine whether the size of the target drop is within acceptable tolerances by comparing the position of the edges of the target drop with the position of the opaque lines, without directly calculating surface area, volume or weight of the target drop.

Based on inputs from the vision control system and based on the desired size of the drops (which information is previously stored in the computer control system), the computer control system generates an error value equal to the difference in the desired size of the drops and the measured size of the target drop. Based on the error value, the computer control system controls the pump and dispenser apparatus 110 to increase or decrease the volume of the drops dispensed.

In an alternate embodiment of the present invention, the computer control system calculates the weight of the target drop based on the calculated volume and based on the specific gravity of the material being dispensed.

In the manner described above, the dispenser system 100 utilizes a closed loop calibration routine to periodically calibrate the size of the drops being dispensed by the pump and dispenser apparatus 110. The volumetric measuring system of the dispensing system 100 overcomes the drawbacks of the prior art systems that utilize a scale to measure the weight of dispensed drops, as the volumetric measuring apparatus is relatively insensitive to changes in ambient temperature and to vibration of the apparatus. Further, since the viewing system used in conjunction with the volumetric measuring apparatus is typically available on prior art dispensers, it is relatively inexpensive to incorporate the volumetric measuring apparatus in accordance with embodiments of the present invention within prior art dispensers.

In one embodiment of the present invention, the top plate 224 and the bottom plate 230 are implemented using Mylar tape or some other transparent material. The Mylar tape for the top plate and the bottom plate are supplied from separate supply rolls of tape. After a calibration routine, each of the rolls of tape is advanced sufficiently to place new sections of tape in the apparatus and to remove the old sections of tape containing the previous target drop. The use of rolls of material for the top and bottom plate allows the dispensing system to automatically perform calibration routines, as the top and bottom plates containing the target samples do not have to be manually removed after each calibration routine. The old sections of tape are collected on disposal rolls of tape. In this manner, the target drops used in the calibration procedure can be easily collected and disposed of.

In another embodiment, only one roll of tape is used to supply tape for both the top and bottom plates. Prior to being placed in the volumetric measuring apparatus, the tape is folded into top and bottom plates or appropriately cut into top and bottom plates. Further, the gap shim may be incorporated into the tape to simplify the apparatus.

In another embodiment of the present invention, the lighting system incorporated within the vision system 130 is not used to illuminate the target drop. Rather, a back lighting system is incorporated into the lower bracket 236 such that light is provided from beneath the target drop through the bottom plate 230. The back lighting system may be implemented using fiber optic probes or other lighting devices incorporated into the lower bracket 236. By providing back lighting, the ability to detect the edges of the target drop 238 is further enhanced.

In embodiments of the invention described above, the viewing system 130 has been described as being mounted on a common arm with the pump and dispenser apparatus 110. In alternate embodiments, the viewing system 130 may be mounted on an arm separate from the pump and dispenser apparatus. Further, a second viewing system, dedicated to the volumetric measuring apparatus, may be included in the dispensing system.

Embodiments of the invention have been described with respect to a dispensing system that dispenses drops of material onto a circuit board or some other substrate. Embodiments of the volumetric and metric system of the present invention are also suitable for use with other systems to determine the volume and/or weight of materials dispensed as lines or in other geometric configurations.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only. It is not intended as limiting. The invention's limit is defined only in the following claims and the equivalence thereto.

What is claimed is:

1. A dispensing system for dispensing material onto a substrate, the dispensing system comprising:
   a housing;
   an arm coupled to the housing and movable in two orthogonal directions;
   a dispensing apparatus, coupled to the arm, that dispenses a metered quantity of material;
   a measuring apparatus, coupled to the housing, including,
      a bottom plate having a top surface to receive the material dispensed from the dispensing apparatus,
      a top plate positionable over the bottom plate after the material has been dispensed, and
      a compressing apparatus, coupled to the top plate and the bottom plate, that compresses the material between the top and bottom plates;
   a viewing system, coupled to the arm, that views the compressed material in the measuring apparatus to provide information from which the quantity of material dispensed may be determined.

2. The dispensing system of claim 1, further comprising:
   a control system, coupled to the viewing system and the dispensing apparatus, that determines the quantity of material dispensed based on the information provided by the viewing system and controls the quantity of material dispensed by the dispensing system, thereby establishing a closed loop system that controls the quantity of material dispensed.

3. The dispensing system of claim 2, wherein the measuring apparatus further includes a gap shim disposed between the top plate and the bottom plate such that the compressed material has a width substantially equal to a width of the gap shim.

4. The dispensing system of claim 3, wherein the dispensing apparatus is constructed and arranged to dispense the material along a dispensing axis that is substantially perpendicular to the top surface of the bottom plate, and wherein the viewing system has a viewing axis substantially perpendicular to the top surface of the bottom plate.

5. The dispensing system of claim 4, wherein the compressed material has a top surface substantially parallel to the top surface of the bottom plate, and wherein the viewing system is constructed and arranged to determine the area of the top surface of the compressed material.

6. The dispensing system of claim 5, wherein the control system determines the volume of the compressed material using the width of the gap shim and the area of the top surface.

7. The dispensing system of claim 6, wherein the control system determines the weight of the compressed material based on the volume of the compressed material and a specific gravity of the compressed material.

8. The dispensing apparatus of claim 7, wherein the bottom plate has at least one line on the top surface detectable by the viewing system.

9. The dispensing apparatus of claim 8, wherein the top plate has a top surface having at least one line detectable by the viewing system.

10. The dispensing system of claim 1, wherein the measuring apparatus further includes a gap shim disposed between the top plate and the bottom plate such that the compressed material has a width equal to a width of the gap shim.

11. The dispensing system of claim 1, wherein the dispensing apparatus dispenses the material along a dispensing axis that is substantially perpendicular to the top surface of the bottom plate, and wherein the viewing system has a viewing axis substantially perpendicular to the top surface of the bottom plate.

12. The dispensing system of claim 1, wherein the compressed material has a top surface substantially parallel to the top surface of the bottom plate, and wherein the viewing system is constructed and arranged to determine the area of the top surface of the compressed material.

13. The dispensing apparatus of claim 1, wherein the bottom plate has at least one line on the top surface detectable by the viewing system.

14. The dispensing apparatus of claim 1, wherein the top plate has a top surface having at least one line detectable by the viewing system.

15. The dispensing system of claim 1, wherein the viewing system is adapted to view the substrate prior to dispensing to detect any misalignment between the dispensing apparatus and the substrate.

16. A dispensing system for dispensing material onto a substrate, the dispensing system comprising:
   a housing;
   an arm coupled to the housing and movable in two orthogonal directions;
   a dispensing apparatus that dispenses a metered quantity of material;
   a measuring apparatus, coupled to the housing, including;
      a bottom plate having a top surface to receive the material dispensed from the dispensing apparatus;
      a top plate positionable over the bottom plate after the material has been dispensed, at least one of the top plate and the bottom plate having an opaque pattern disposed thereon; and
      a compressing apparatus, coupled to the top plate and the bottom plate, that compresses the material between the top and bottom plates;
   means for determining the quantity of material dispensed by comparing the material compressed in the measuring apparatus with the opaque pattern;
   wherein the dispensing apparatus and the means for determining are coupled to the arm.

17. The dispensing system of claim 16, further comprising:
   means for controlling the quantity of material dispensed by the dispensing apparatus based on the quantity of material determined by the means for determining, thereby establishing a closed loop system that controls the quantity of material dispensed.

18. The dispensing system of claim 17, wherein the compressed material has a top surface substantially parallel to the top surface of the bottom plate, and wherein the means for determining determines the area of the top surface of the compressed material.

19. The dispensing system of claim 18, wherein the means for determining determines a volume of the compressed material.

20. The dispensing system of claim 19, wherein the means for determining determines a weight of the compressed material.

21. The dispensing system of claim 21, wherein the compressed material has a top surface substantially parallel to the top surface of the bottom plate, and wherein the means for determining determines the area of the top surface of the compressed material.

22. The dispensing system of claim 21, wherein the means for determining determines a volume of the compressed material.

23. The dispensing system of claim 21, wherein the means for determining determines a weight of the compressed material.

24. The dispensing system of claim 16, wherein the means for determining the quantity dispensed includes means for aligning the substrate with the dispensing apparatus prior to the dispensing of material.

* * * * *